US008682138B2

(12) United States Patent
Yamada et al.

(10) Patent No.: US 8,682,138 B2
(45) Date of Patent: Mar. 25, 2014

(54) ELECTRONIC APPARATUS, CONTENT REPRODUCTION METHOD, RECORD MEDIUM, AND SERVER APPARATUS

(75) Inventors: Eiju Yamada, Kanagawa (JP); Yosuke Yukihira, Kanagawa (JP)

(73) Assignee: Sony Corporation, Tokyo (JP)

( * ) Notice: Subject to any disclaimer, the term of this patent is extended or adjusted under 35 U.S.C. 154(b) by 1350 days.

(21) Appl. No.: 12/464,437

(22) Filed: May 12, 2009

(65) Prior Publication Data
US 2009/0285550 A1 Nov. 19, 2009

(30) Foreign Application Priority Data

May 14, 2008 (JP) ................................ P2008-127205

(51) Int. Cl.
*H04N 9/80* (2006.01)
(52) U.S. Cl.
USPC ................................ 386/248; 386/239; 726/3
(58) Field of Classification Search
USPC ................................................. 386/239, 248
See application file for complete search history.

(56) References Cited

U.S. PATENT DOCUMENTS

| 2003/0174154 A1* | 9/2003 | Yukie et al. | 345/700 |
| 2004/0193482 A1* | 9/2004 | Hoffman et al. | 705/14 |
| 2004/0267790 A1* | 12/2004 | Pak et al. | 707/100 |
| 2009/0162032 A1* | 6/2009 | Patel | 386/123 |

FOREIGN PATENT DOCUMENTS

| JP | 2002-369154 | 12/2002 |
| JP | 2007-020211 | 1/2007 |
| JP | 2007-508660 | 4/2007 |
| JP | 2007-528621 | 10/2007 |
| JP | 2008-193585 | 8/2008 |

* cited by examiner

*Primary Examiner* — Helen Shibru
(74) *Attorney, Agent, or Firm* — Finnegan, Henderson, Farabow, Garrett & Dunner, L.L.P.

(57) ABSTRACT

An electronic apparatus is disclosed. A reproduction section allows first video content containing a plurality of types of data and first identification information to be reproduced. A transmission section transmits the first identification information to a server apparatus. A reception section receives a first application and first access control information from the server apparatus, the first application being associated with the first video content and being retrieved by the server apparatus based on the transmitted first identification information, the first access control information being generated by the server apparatus based on the first identification information and representing a condition in which the first application accesses the individual types of the data contained in the first video content. A control section executes the received first application based on the received first access control information when the first video content is reproduced.

21 Claims, 12 Drawing Sheets

FIG.9A

```
<?xml version="1.0" encoding="UTF-8">
<media>
  <id>1234567890</id>
  <title>Spiderman2</title>
  <rating>18</rating>
  ...
</media>
<player>
  <pcontrol>false</pcontrol>
  <camera>true</camera>
  <mic>true</mic>
  <display size="42"></display>
  ...
</player>
```
~65

FIG.9B

```
<?xml version="1.0" encoding="UTF-8">
<app>
  <item>
    <name>Bmazon</name>
    <icon>http://www.bmazon.com/logo.gif</icon>
    <url>http://www.bmazon.com/dl/bdap.jar</url>
    <description>Online Shopping!</description>
    <size>4649</size>
  </item>
  <item>
    <name>Movie Trailer</name>
    <icon>http://www.sonypictures.com/spe.gif</icon>
    <url>http://www.sonypictures.com/bd/mt.jar</url>
    <description>The Newest Movie Trailer</description>
    <size>5296</size>
  </item>
  ...
</app>
```
~66

FIG.9C

```
<security-policy>
  <allow-access-all data="time"/>
  <allow-access-all data="subtitle"/>
  <allow-access data="movie">
    <timeline="00:00:00:00-00:20:56:12">
    <timeline="00:25:03:01-00:30:23:11">
    ...
  <deny-access data="meta">
    <word>fuck</word>
    ...
</security-policy>
```
~67

ELECTRONIC APPARATUS, CONTENT REPRODUCTION METHOD, RECORD MEDIUM, AND SERVER APPARATUS

BACKGROUND OF THE INVENTION

1. Field of the Invention

The present invention relates to an electronic apparatus, a content reproduction method, a record medium, and a server apparatus connected to the electronic apparatus, each of which is capable of reproducing content from a record medium such as a Blu-ray disc (BD).

2. Description of the Related Art

In the BD-ROM (Read Only Memory) standards, a so-called BD-J (BD-Java (registered trademark)), which is a Java (registered trademark) based application, has been used. A BD-J has an interactive function (that is a network connecting function). With the interactive function, a BD-ROM reproduction apparatus can download an application associated with video content recorded on a BD-ROM from a network and execute the downloaded application.

For example, Japanese Patent Application Laid-Open Publication No. 2007-508660, hereinafter referred to as Patent Document 1, discloses a player that is linked to a web server such that while content is being reproduced from an optical disc, an application and content such as sound, subtitle, and so forth can be downloaded from the web server to allow the content of the optical disc to collaborate with content of the web server. The optical disc whose data are reproduced by the player has a public key used to check whether or not downloaded content has been authenticated. The player reads content and a public key from the optical disc and authenticates the downloaded content with the public key. Thus, the content of the optical disc and the player are prevented from being damaged by hacking caused by the downloaded content.

SUMMARY OF THE INVENTION

However, the player disclosed in Patent Document 1 does not define any execution method of a downloaded application that collaborates with the content of the optical disc. Thus, even if a downloaded application has been authenticated, when it is executed, depending on the execution manner thereof, content of the optical disc may be modified and/or controlled in a manner not intended by the content provider. The situation may disappoint the user of content of the optical disc.

In view of the foregoing, it would be desirable to provide an electronic apparatus, a content reproduction method, a record medium, and a server apparatus that allow an application associated with content that is being reproduced to be executed in an optimum state for content.

According to an embodiment of the present invention, there is provided an electronic apparatus. The electronic apparatus includes a reproduction means, a transmission means, a reception means, and a control means. The reproduction means allows first video content containing a plurality of types of data and first identification information to be reproduced. The transmission means transmits the first identification information to a server apparatus. The reception means receives a first application and first access control information from the server apparatus, the first application being associated with the first video content and being retrieved by the server apparatus based on the transmitted first identification information, the first access control information being generated by the server apparatus based on the first identification information and representing a condition in which the first application accesses the individual types of the data contained in the first video content. The control means executes the received first application based on the received first access control information when the first video content is reproduced.

Examples of the electronic apparatus include digital video players such as a BD player and a DVD player, digital video recorders such as a BD recorder, a DVD recorder, and a hard disc drive (HDD) recorder, a personal computer (PC), a game machine, a mobile phone, a portable audio/visual reproduction device, a digital video camera, a personal digital assistant (PDA), a car navigation device, a robot device, and other electric appliances. Examples of the plurality of types of data include main program video data, bonus video data, audio/music data, subtitle data, time line data, and metadata. Examples of the first application include various types of applications such as a game application, an E-commerce shopping application for songs, products, and tour tickets, a performer data retrieval application, and a learning application. The first content may be obtained from a network, a broadcasting signal, or a portable record medium such as an optical disc.

In this structure, the electronic apparatus transmits the first identification information of the first video content to the server apparatus and receives the first access control information along with the first application associated with the first video content from the server apparatus. Thus, while the first video content is being reproduced, although the application associated with the content can be executed, the application can be suppressed from minimally accessing the first video content. As a result, the application can be prevented from modifying and/or controlling content in a manner not intended by the content provider. In addition, the application can be prevented from disappointing the user. In other words, when content is reproduced, the application associated with the content can be executed in an optimum state for the content.

In the electronic apparatus, the reception means may receive the first access control information again from the server apparatus when the received first application is executed. The control means may execute the received first application based on the first access control information which has been received again.

Thus, even if the first access control information that has been obtained when the application is received is different from the first access control information that has been obtained when the application is executed, the application can be appropriately controlled to access the first video content based on latest information.

In the electronic apparatus, the first video content may have been recorded on a first portable record medium along with a first program which causes the first video content to be reproduced and the first identification information to be transmitted. The control means may execute the first program which has been recorded.

Examples of the first portable record medium include optical discs such as a BD (Blu-ray Disc) and a DVD and a memory card containing a flash memory. The first program is structured, for example, as a Java (registered trademark) based application (BD-J). In this structure, using the first program recorded on a portable record medium separated from the electronic apparatus, not only the first video content is reproduced, but the first application associated with the first video content can be received and executed.

In the electronic apparatus, the reception means receives a list of a plurality of different applications including the first application retrieved by the server apparatus therefrom and receives a plurality of applications selected from the list and one piece of the first access control information from the server apparatus, the first access control information being generated by the server apparatus and representing a condition in which the selected plurality of applications access the individual types of the data. The transmission means may transmit a transmission request signal which requests for transmission of the selected applications to the server apparatus. The control means may receive a user's operation input which selects the plurality of applications and executes the received plurality of applications based on the received one piece of the first access control information.

Thus, when there are a plurality of applications associated with the first video content, they can be selected from a list. In addition, the plurality of applications can be controlled to access data with the one piece of the first access control information. Thus, the load imposed to the electronic apparatus can be suppressed to be minimum in comparison with the case that the electronic apparatus receives access control information for each application and executes the received application corresponding to the access control information.

In the electronic apparatus, the control means may obtain information about specifications of at least either of hardware specifications and software specifications of the electronic apparatus by executing the first program. The transmission means may transmit the obtained information about specifications to the server apparatus along with the first identification information by executing the first program. The reception means may receive, by executing the first program, the first application retrieved by the server apparatus based on the first identification information and the information about specifications that have been transmitted.

Thus, an application appropriately corresponding to hardware specifications or software specifications of the electronic apparatus can be received and executed along with an application associated with the first video content. Examples of the hardware specifications include information about a clock frequency of a central processing unit (CPU) as the control means, a storage capacity of a memory, and a network connection rate of a network interface as the transmission means and the reception means. Examples of the software specifications include information about applicable fonts, applicable character codes, permission/prohibition of floating decimal point calculations, and applicable application programming interface (API).

The electronic apparatus may also include a connection means connectable to an external device. The control means may obtain connected device information about the connected external device through the connection means by executing the first program. The transmission means may transmit the obtained connected device information to the server apparatus along with the first identification information and the specification information. The reception means may receive, by executing the first program, the first application retrieved by the server apparatus based on the first identification information, the specification information, and the connected device information which have been transmitted.

Examples of the external device include input/output devices such as a display device, a microphone, a mouse, a keyboard, and a remote controller, and devices such as an image capturing device. The external device is not limited to one directly connected to the electronic apparatus, but one indirectly connected to the electronic apparatus through another external device. Examples of the connected device information include the type and connection method of the external device, the screen size of the display device, the number of effective colors, luminance information, and the display mode (multi-display mode, picture-in-picture (PinP) mode, etc.).

In this structure, when information about the external device connected to the electronic apparatus is transmitted to the server apparatus, an application corresponding to the connection environment can be retrieved and received from the server apparatus. For example, the electronic apparatus can retrieve and receive from the server apparatus an application that can be executed with appropriate fonts and luminance corresponding to specifications of the display device. In addition, when a microphone and an image capturing device have been connected to the electronic apparatus, it can retrieve and receive from the server apparatus a language learning application that uses them.

The electronic apparatus may also include a storage means which stores first reproduction history information that denotes whether or not the first video content has been reproduced by the reproduction means based on the first identification information. The reproduction means may be capable of reproducing second video content which has summary information of the first video content and which is a sequel of the first video content. The control means may determine whether or not the first video content has been reproduced based on the first reproduction history information when the second video content is reproduced and controls the reproduction means not to reproduce the summary information if the control means has determined that the first video content has been reproduced.

In this structure, when the second video content is reproduced, summary information can be controlled to be reproduced or not reproduced based on the first reproduction history information of the first video content. Thus, if the user of the electronic apparatus watches the second video content after he or she watched the second video content, the summary information of the first video content can be prevented from being unnecessary reproduced. As a result, the user can effectively watch video content as he or she wants. Examples of the sequel include content that continues in a story from a prequel and content having a story developed from a story or a theme of the prequel.

In the electronic apparatus, the control means may control the reproduction means to reproduce the summary information if a predetermined period has elapsed after the first reproduction history information has been stored when the second video content is reproduced.

Thus, if it took a long time after the user watched the first content, the first summary information is reproduced before he or she watches the second content, he or she is allowed to remind the substance of the first content. Examples of the predetermined period include one week, one month, one year, and so forth. However, the predetermined period is not limited to these periods. In addition, the predetermined period may be customized by the user.

In the electronic apparatus, the second video content may contain a plurality of types of data and second identification information and have been recorded on a second portable record medium along with a second program which causes the second video content to be reproduced and the second identification information to be transmitted. The transmission means may transmit the second identification information and the first reproduction history information to the server apparatus when the second video content is reproduced. The reception means may receive a second application and second access control information from the server apparatus, the second application being retrieved by the server apparatus when it has been determined, based on the second identification information and the first reproduction history information which have been transmitted, that the first content has not been reproduced and allowing the user to buy the first video content, the second access control information representing a condition in which the second application accesses the individual types of the data contained in the second video content. The control means may execute the received second application based on the received second access control information when the second video content is reproduced.

In this structure, when the second video content is reproduced if the first video content, which is the prequel of the second video content, has not been reproduced by the reproduction means, an application that allows the user to buy the first video content can be received from the server apparatus and can be executed. Thus, the user can know the story of the first video content and more enjoy the second video content. In addition, the second application can be caused to minimally access the second video content such that it is prevented from being modified and/or controlled in a manner not intended by the content provider.

In the electronic apparatus, the first video content may contain preview information of the second video content. The storage means may store second reproduction history information which denotes whether or not the second video content has been reproduced by the reproduction means based on the second identification information. The control means may determine whether or not the second video content has been reproduced based on the second reproduction history information when the first video content is reproduced and controls the reproduction means not to reproduce the preview information if the control means has determined that the second video content has been reproduced.

Thus, when the first video content is reproduced, preview information can be controlled whether or not to be reproduced based on the reproduction history of the second video content. Thus, when the user of the electronic apparatus watches the first video content after the second video content, the preview information of the second video content can be prevented from being unnecessarily reproduced. Thus, the user can be allowed to effectively watch video content as he or she wants. In other words, the first and second video content can be optimized based on their reproduction histories.

The electronic apparatus may also include a connection means connected to a display device. The control means may obtain display performance information about a display performance of the display device through the connection means from the display device, change a font and a luminance of character information contained in the first video content based on the display performance information which has been obtained, and output the resultant first video content to the display device by executing the first program.

Examples of the display performance information include a screen size, the number of effective colors, luminance information, a current display mode (multi-display mode, PinP mode, etc.). Thus, character information of the first video content can be optimized based on the specifications of the display device. As a result, in any environment, user's visibility and convenience can be easily secured.

In the electronic apparatus, the first video content may contain audience age restriction information which restricts a user who is under a predetermined age from watching the first video content. The transmission means may transmit, by executing the first program, the audience age restriction information to the server apparatus along with the first identification information. The reception means may receive the first application having the audience age restriction information and being retrieved by the server apparatus based on the first identification information and the audience age restriction information which have been transmitted by executing the first program.

The audience age restriction information is information that accomplishes a so-called parental lock or rating system. Thus, when the audience age restrictions have been applied to the first video content, the first application associated with the first video content can also execute the audience age restrictions. In other words, the server apparatus can retrieve applications that do not satisfy age restrictions as the first application and prevent the electronic apparatus from receiving these applications.

In the electronic apparatus, the first access control information may contain execution location information which restricts an execution location of the first application to a predetermined execution location over a network. The control means may restrict the first application from being executed in other than the predetermined execution location based on the execution location information.

Thus, even if the first application has been prohibited from being executed at other than a predetermined execution location, the first access control information can adequately control execution of the first application. Examples of the predetermined execution location include URLs of predetermined countries and areas. For example, when the first application is an application that allows the user to buy songs through a worldwide music delivery service, the execution location of the first application can be restricted to service providing servers disposed in other than Japan. Thus, even if copyright coverage differs in each country's legal system, execution of the first application can be adequately controlled.

According to another embodiment of the present invention, there is provided a content reproduction method. Identification information which identifies video content containing a plurality of types of data is transmitted to a server apparatus. An application and an access control information are received from the server apparatus, the application being associated with the video content and being retrieved by the server apparatus based on the transmitted identification information, the access control information being generated by the server apparatus based on the identification information. The access control information represents a condition in which the application accesses the individual types of the data contained in the video content. The received application is executed based on the received access control information when the video content is reproduced.

In this structure, when video content is reproduced, although an application associated with the video content can be executed, the application can be caused to minimally access the video content. Thus, the application can be prevented from modifying content in a manner not intended by the content provider and disappointing the user. In other words, when content is reproduced, an application associated with the content can be executed in an optimum state for the content.

According to another embodiment of the present invention, there is provided a record medium on which a program has been recorded, the program being executed by an electronic apparatus. Identification information which identifies video content containing a plurality of types of data is transmitted to a server apparatus. An application and an access control information are received from the server apparatus, the application being associated with the video content and being retrieved by the server apparatus based on the transmitted identification information, the access control information being generated by the server apparatus based on the identification information and representing a condition in which the application accesses the individual types of the data contained in the video content. The received application is executed based on the received access control information when the video content is reproduced.

Examples of the record medium include optical discs such as a BD and a DVD and a memory card having a built-in flash memory. The program is structured, for example, as a Java (registered trademark) based application (BD-J).

According to another embodiment of the present invention, there is provided a server apparatus. The server apparatus includes a reception means, a retrieval means, a generation means, and a transmission means. The reception means receives identification information from an electronic apparatus which is capable of reproducing video content containing a plurality of types of data and the identification information. The retrieval means retrieves an application associated with the video content based on the received identification information. The generation means generates access control information which represents a condition in which the retrieved application accesses the individual types of the data contained in the video content. The transmission means transmits the retrieved application and the generated access control information to an electronic apparatus.

In this structure, by retrieving an application based on identification information received from the electronic apparatus, it can be caused to execute an application associated with video content. In addition, by generating the access control information and transmitting it to the electronic apparatus, the application is prevented from modifying the content in a manner not intended by the content provider and disappointing the user. In other words, when content is reproduced by the electronic apparatus, an application associated with the content can be executed in an optimum state for the content.

In the server apparatus, the reception means may receive from the electronic apparatus information about specifications of at least either of hardware specifications and software specifications of the electronic apparatus. The retrieval means may retrieve the application based on the identification information and the information about specifications which have been received.

In the server apparatus, the reception means may receive connected device information about an external device connected to the electronic apparatus from the electronic apparatus. The retrieval means may retrieve the application based on the identification information and the connected device information which have been received.

In the server apparatus, the reception means may receive reproduction history information that denotes whether or not the video content has been reproduced by the electronic apparatus from the electronic apparatus. The retrieval means may retrieve the application based on the identification information and the reproduction history information which have been received.

According to another embodiment of the present invention, there is provided an electronic apparatus. The electronic apparatus includes a reproduction section, a transmission section, a reception section, and a control section. The reproduction section allows first video content containing a plurality of types of data and first identification information to be reproduced. The transmission section transmits the first identification information to a server apparatus. The reception section receives a first application and first access control information from the server apparatus, the first application being associated with the first video content and being retrieved by the server apparatus based on the transmitted first identification information, the first access control information being generated by the server apparatus based on the first identification information and representing a condition in which the first application accesses the individual types of the data contained in the first video content. The control section executes the received first application based on the received first access control information when the first video content is reproduced.

According to another embodiment of the present invention, there is provided a server apparatus. The server apparatus includes a reception section, a retrieval section, a generation section, a transmission section. The reception section receives identification information from an electronic apparatus which is capable of reproducing video content containing a plurality of types of data and the identification information. The retrieval section retrieves an application associated with the video content based on the received identification information. The generation section generates access control information which represents a condition in which the retrieved application accesses the individual types of the data contained in the video content. The transmission section transmits the retrieved application and the generated access control information to an electronic apparatus.

Thus, according to an embodiment of the present invention, when content is reproduced, an application associated with the content can be executed in an optimum state for the content.

These and other objects, features and advantages of the present invention will become more apparent in light of the following detailed description of best mode embodiments thereof, as illustrated in the accompanying drawings.

BRIEF DESCRIPTION OF DRAWINGS

FIG. 9A, FIG. 9B, and FIG. 9C are schematic diagrams showing examples of reproduction environment information, an application list, and a security policy file in an embodiment of the present invention;

DESCRIPTION OF PREFERRED EMBODIMENTS

Next, with reference to the accompanying drawings, embodiments of the present invention will be described.

Figure 1:
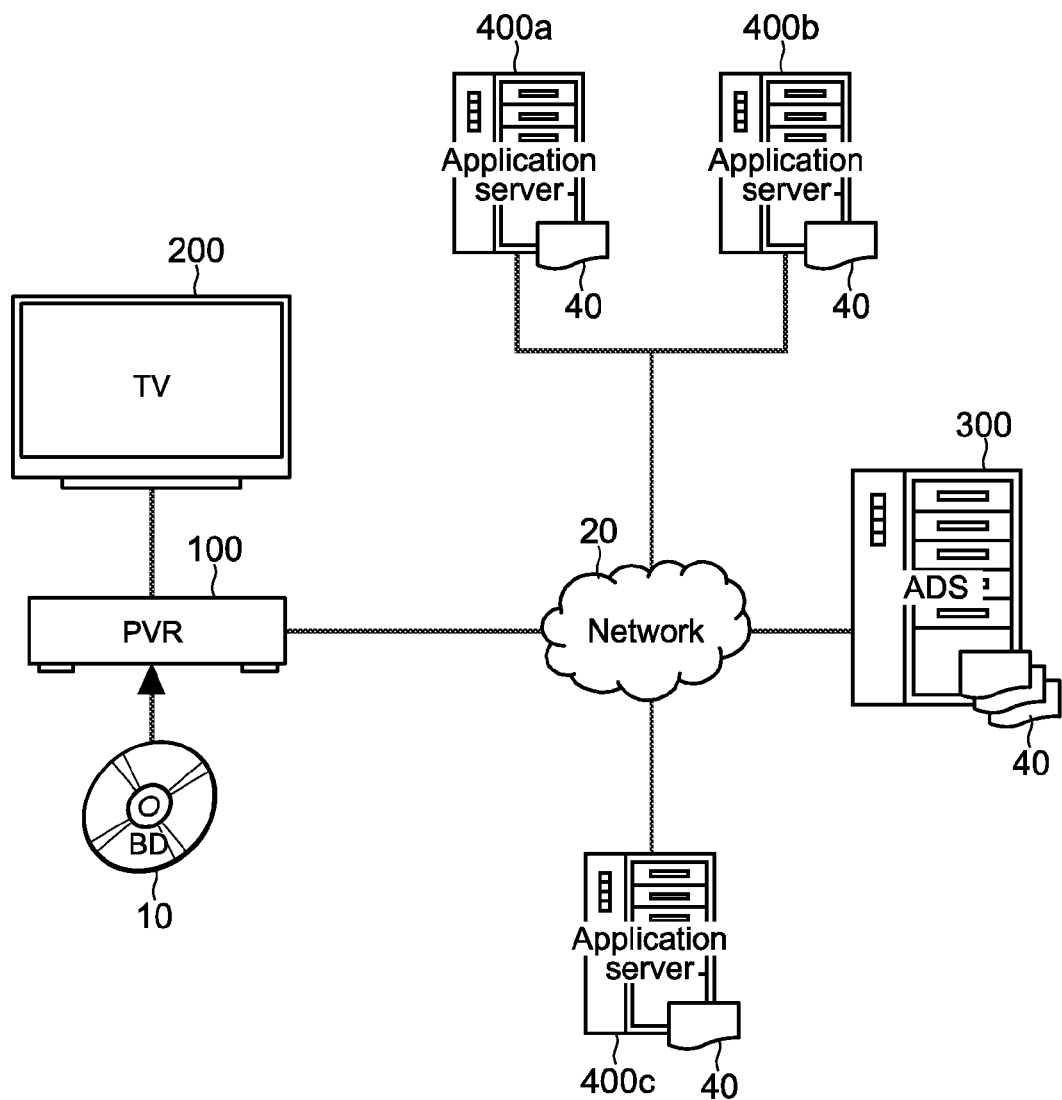
FIG. 1 is a schematic diagram showing a structure of a system according to an embodiment of the present invention.

FIG. 1 is a schematic diagram showing a structure of a system according to an embodiment of the present invention.

As shown in FIG. 1, the system includes a digital video recorder 100 (hereinafter referred to as the DVR 100) and an application discovery server 300 (hereinafter referred to as the ADS 300).

The DVR 100 can reproduce video content from an optical disc such as a BD-ROM 10, receive broadcast content, and record it on the BD-ROM 10. Connected to the DVR 100 is a television device 200 (hereinafter referred to as the TV 200) as a display device that displays video content reproduced by the DVR 100. The DVR 100 has been connected to the ADS 300 through a network 20 such as the Internet or a local area network (LAN).

The ADS 300 is managed by a content provider that provides video content recorded on the BD-ROM 10. There are a plurality of ADSs 300 corresponding to titles of video content recorded on the BD-ROM 10 (only one of ADSs 300 is shown in the drawing). Each of the ADSs 300 is connected to a plurality of application servers 400 (400a to 400c) through the network 20. The application servers 400 each store various types of applications 40. The application servers 400 are managed by respective service providers that provide various types of services using the applications 40. It should be noted that the number of application servers 400 is not limited to three. The ADS 300 retrieves an application 40 associated with video content recorded on the BD-ROM 10 from the individual application servers 400 corresponding to a request from the DVR 100. The application 40 obtained by the ADS 300 is downloaded to the DVR 100 and executed while video content recorded on the BD-ROM 10 is being reproduced.

Figure 2:
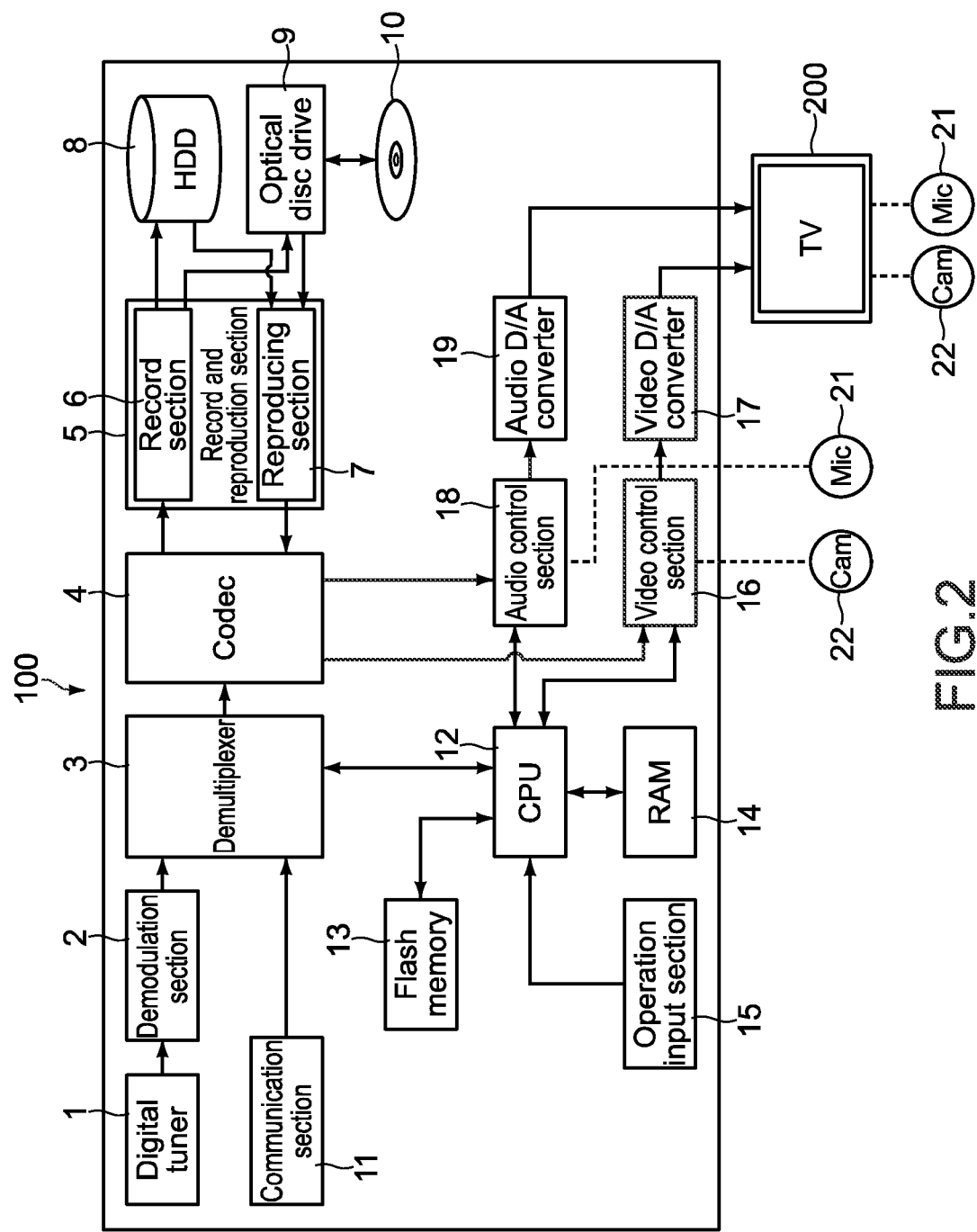
FIG. 2 is a block diagram showing a structure of a DVR according to an embodiment of the present invention.

FIG. 2 is a block diagram showing a structure of the DVR 100.

As shown in FIG. 2, the DVR 100 includes a digital tuner 1, a demodulation section 2, a demultiplexer 3, a codec 4, a record and reproduction section 5, a HDD 8 (storage means), an optical disc drive 9, a communication section 11 (transmission means, reception means), a central processing unit (CPU) 12 (control means), a flash memory 13 (storage means), a random access memory (RAM) 14 (storage means), an operation input section 15, a video control section 16, a video digital/analog (D/A) converter 17, an audio control section 18, and an audio digital/analog (D/A) converter 19.

The digital tuner 1 selects a particular channel of a digital broadcast through an antenna (not shown) under the control of the CPU 12 and receives a broadcast signal containing broadcast program data. This broadcast signal is an MPEG stream encoded according, for example, to the MPEG-2 TS format, but not limited thereto. The demodulation section 2 demodulates the broadcast signal that has been modulated.

The demultiplexer 3 demultiplexes a multiplexed broadcast signal into a video signal and an audio signal, which have been compressed. The codec 4 decodes the demultiplexed video signal and audio signal. In addition, the codec 4 can transcode signal formats of the video signal and audio signal into other formats corresponding to output destinations for the video signal and audio signal.

The record and reproduction section 5 includes a record section 6 and a reproducing section 7 (reproduction means). The record section 6 temporarily stores the video signal and audio signal that have been demodulated by the demodulation section 2 and that have been compressed or when necessary temporarily stores the video signal and audio signal transcoded by the codec 4. While controlling output timings and data amounts of the video signal and audio signal, the record section 6 outputs them to the HDD 8 and the optical disc drive 9 and causes them to record the video signal and audio signal. The reproduction section 7 reads a video signal and an audio signal of content from the HDD 8 and/or an optical disc. While controlling output timings and data amounts of the video signal and audio signal, the reproduction section 7 outputs them to the codec 4 and causes it to decode and reproduce them.

The HDD 8 stores the application 40 received from the application server 400 over the network 20 and reproduction history information of video content on the BD-ROM 10 as well as broadcast program data received through the digital tuner 1. The reproduction history information contains a content ID and reproduction date/time of video content reproduced by the recording and reproduction section 5. In addition, the HDD 8 stores any types of content including video content, still image content, and music content that are input from external devices such as a digital camera through various types of interfaces (not shown) (connection means) in a built-in hard disc. Moreover, the HDD 8 stores various types of programs including an operating system (OS), other applications, and other types of data. When data are read from the hard disc and reproduced, the HDD 8 reads them from the hard disc and outputs the obtained data to the recording and reproduction section 5.

The optical disc drive 9 has an insertion section (not shown) into which an optical disc is inserted (loaded). The optical disc drive 9 can write data to a recordable/rewritable optical disc such as a BD-R (recordable), a BD-RE (rewritable), or the like that has been inserted into the insertion section and read data from a readable optical disc such as the BD-ROM 10. Beside these, examples of the optical disc include a DVD and a CD.

The communication section 11 is a network interface connecting to the network 20, through which data such as an application is downloaded from the ADS 300 according to a protocol such as the transmission control protocol/internet protocol (TCP/IP).

When necessary, the CPU 12 accesses the RAM 14 and so forth and totally controls each block of the DVR 100. For example, the CPU 12 controls, for example, a BD-J application to perform a reproduction process for video content stored in the BD-ROM 10 and the application 40 to perform an execution process. In addition, as will be described later, the CPU 12 controls a creation process for reproduction history information of video content, a process of obtaining specification information about hardware and/or software of the DVR 100, and a process of obtaining information about an external device connected to the DVR 100.

The flash memory 13 is a nonvolatile memory that retains an OS, programs, and firmware of various parameters and so forth that the CPU 12 executes. The RAM 14 is used as a work area for the CPU 12 and temporarily stores the OS, programs, processed data, and so forth.

The operation input section 15 inputs various setting values and commands that the user inputs on a remote controller (not shown) having, for example, a plurality of keys and outputs them to the CPU 12. Of course, instead of a remote controller, the operation input section 15 may be a keyboard and a mouse connected to the DVR 100, and/or switches disposed thereon.

The video control section 16 performs a graphic process such as an on-screen display (OSD) process for a video signal that is output from the codec 4 and data that are output from the CPU 12 to generate a video signal that is displayed on the TV 200. The video D/A converter 17 converts a digital video signal that is input from the video control section 16 into an analog video signal and outputs it to the TV 200.

The audio control section 18 performs an amplifying process, an audio volume controlling process, and so forth for a digital audio signal generated by the CPU 12 and outputs the processed audio signal to the audio D/A converter 19. The audio D/A converter 19 converts the digital audio signal that is input from the codec 4 into an analog audio signal and outputs the analog audio signal to a speaker of the TV 200.

The TV 200 displays the analog video signal on a display section (not shown). The TV 200 outputs the analog audio signal to the speaker of the TV 200 or an external speaker (not shown).

Recorded on the BD-ROM 10 are various types of data that compose video content and a Java (registered trademark) based application (BD-J) that controls reproduction of the video content, connection with the network 20, and execution and so forth of the application 40 associated with video content. When video content is reproduced from the BD-ROM 10, the BD-J is read to the RAM 14 along with the video content. The BD-J stores a URL with which the ADS 300 is accessed, a program that obtains the applications 40 from the ADS 300 corresponding to the URL, a program that obtains information about the DVR 100 and the external device, and so forth. The BD-J can execute the application 40 downloaded from the ADS 300 corresponding to the URL like the video content or as if the application 40 were recorded on the BD-ROM 10. The BD-ROM 10 contains a content ID that uniquely identifies a title of video content recorded on the BD-ROM 10.

A microphone 21 and a camera 22 as external devices can be connected to the DVR 100 through an interface such as a universal serial bus (USB) (connection means).

The microphone 21 collects, for example, a user's voice, converts it into an analog audio signal, and outputs it to the audio control section 18. The audio control section 18 converts the analog audio signal that is input from the microphone 21 into a digital audio signal and outputs the digital audio signal to the CPU 12.

In the camera 22, an image sensor such as a complementary metal oxide semiconductor (CMOS) sensor or a charge coupled device (CCD) captures an image, for example, of the face of the user and outputs the captured image data as digital data to the video control section 16. The video control section 16 outputs the captured image data that are input from the camera 22 to the CPU 12.

The microphone 21 and the camera 22 can be also connected to the TV 200. Other external devices such as a remote controller are connectable to the DVR 100 and the TV 200 through any one of various types of wired or wireless interfaces (connection means).

Figure 3:
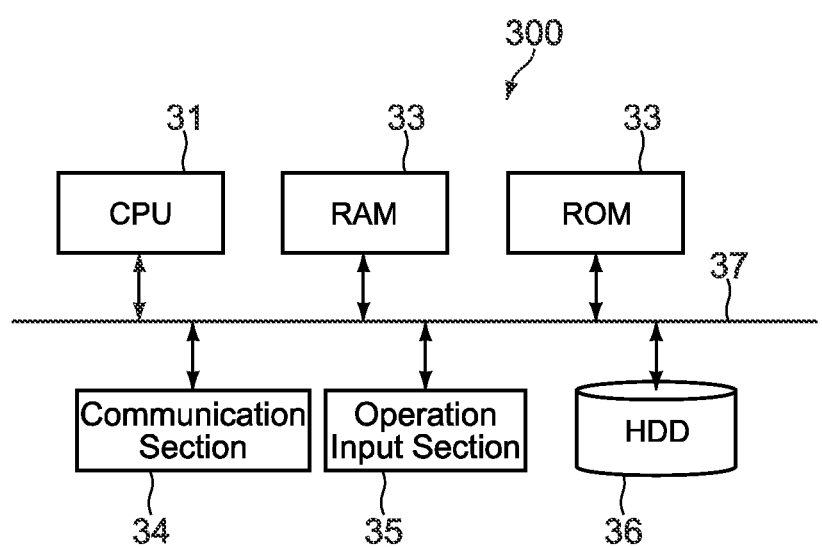
FIG. 3 is a block diagram showing a structure of an ADS according to an embodiment of the present invention.

FIG. 3 is a block diagram showing a structure of the ADS 300.

As shown in FIG. 3, the ADS 300 includes a CPU 31 (retrieval means, generation means), a RAM 32, a read-only memory (ROM) 33, a communication section 34 (reception means, transmission means), an operation input section 35, and a HDD 36 that are connected through a bus 37.

When necessary, the CPU 31 accesses the RAM 32 and performs various types of calculation processes such as a retrieval process for applications 40 and a process of creating a security policy file so as to totally control each block of the ADS 300. The RAM 32 is used as a work area for the CPU 31 and temporarily stores, for example, an OS, programs, and data to be transmitted to the DVR 100. The ROM 33 is a nonvolatile memory that retains the OS, programs, and firmware of various types of parameters and so forth that the CPU 31 executes.

The communication section 34 is an interface that communicates with the DVR 100 and the application server 400 through the network 20. The operation input section 35 is composed of a mouse, a keyboard, buttons, switches, operation confirmation indicators, and so forth. The operation input section 35 inputs various types of commands that a supervisor of the content provider operates and outputs them to the CPU 31.

The HDD 36 stores the OS, programs, and data in the built-in hard disc, and reads them from the hard disc to the RAM 32. In addition, the HDD 36 stores applications 40 obtained from the application server 400 and data such as a security policy file (that will be described later).

The ADS 300 provides applications 40 associated with video content of the BD-ROM 10 to the DVR 100 and has an access control function for the applications 40 to video content corresponding to the foregoing security policy file. Next, this access control will be described.

Figure 4:
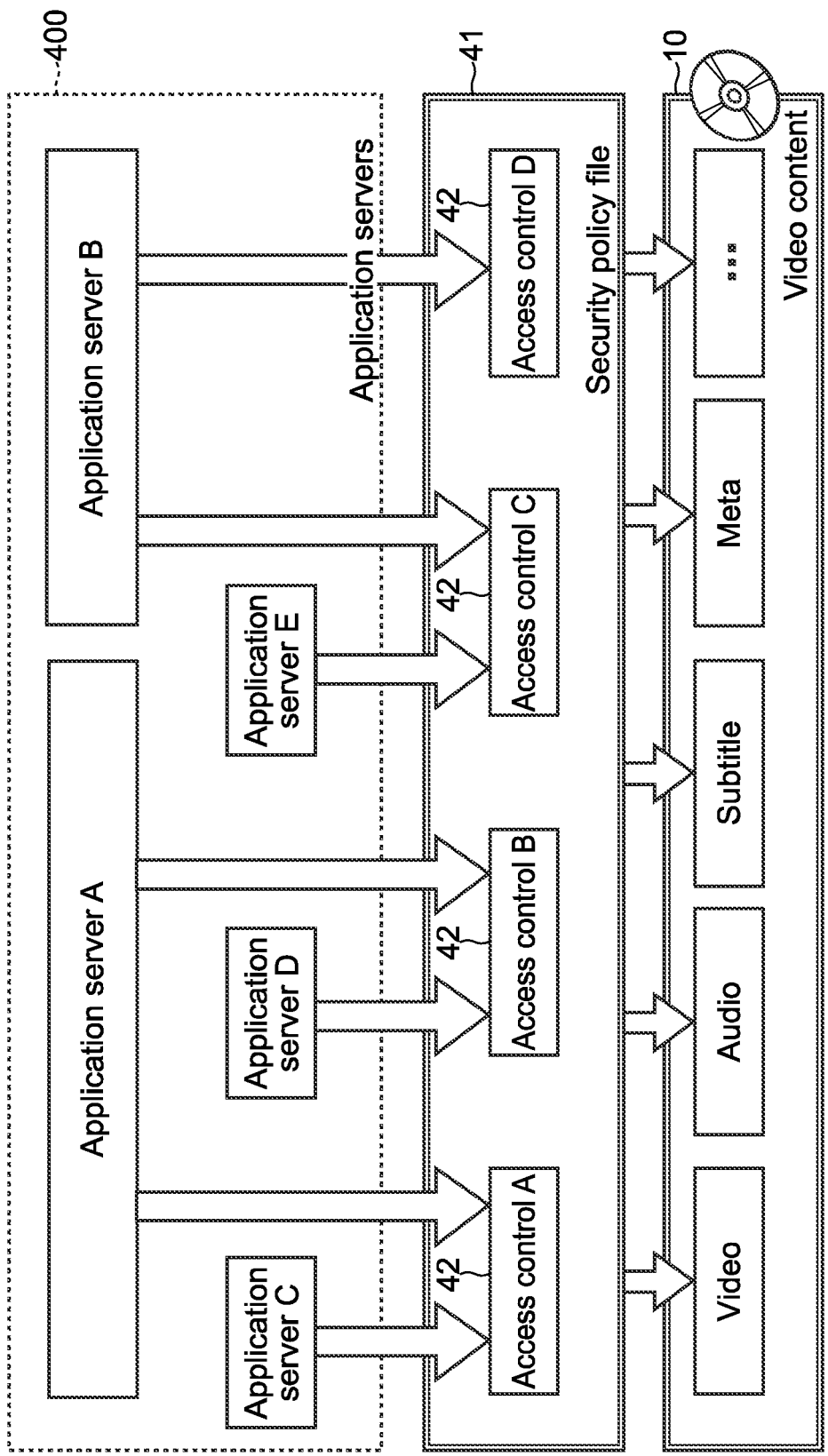
FIG. 4 is a schematic diagram showing a concept of an access control executed in an embodiment of the present invention.

FIG. 4 shows a concept of the access control.

As shown in FIG. 4, the ADS 300 has a security policy file 41 that defines conditions in which the applications 40 provided by the application server 400 access a plurality of types of data of the video content recorded on the BD-ROM 10. Examples of the plurality of types of data of the video content recorded on the BD-ROM 10 include video data, audio data, subtitle data, metadata, and other data. Examples of the metadata or other data include character data, time line data, and sound track music data.

The security policy file 41 has a plurality of pieces of access control information 42. Individual content providers define the access control information 42 for each application server 400. In other words, each piece of access control information 42 functions as an API that each application server 400 can use. For example, in FIG. 4, application server A can use access controls A and B; application server B can use access controls C and D; application server c can use only access control A; application server D can use only access control B; and application server E can use only access control C.

As will be described later, after a list of applications retrieved by the ADS 300 has been provided to the DVR 100, when the DVR 100 issues a download request for the application 40, the ADS 300 creates the security policy file 41. The created security policy file 41 is transmitted to the DVR 100 along with the requested application 40. The DVR 100 executes the downloaded application 40 based on the security policy file 41.

Next, operations of the DVR 100 and the ADS 300 having the foregoing structure will be described. When reproducing video content of the BD-ROM 10, the DVR 100 of this embodiment can optimize the video content based on the reproduction environment. In addition, the DVR 100 can download an application 40 associated with the video content from the ADS 300 and execute the application 40 such that the video content is reproduced in an optimum state. When the application 40 is executed, the application 40 is controlled to access the video content based on the security policy file 41.

Figure 5:
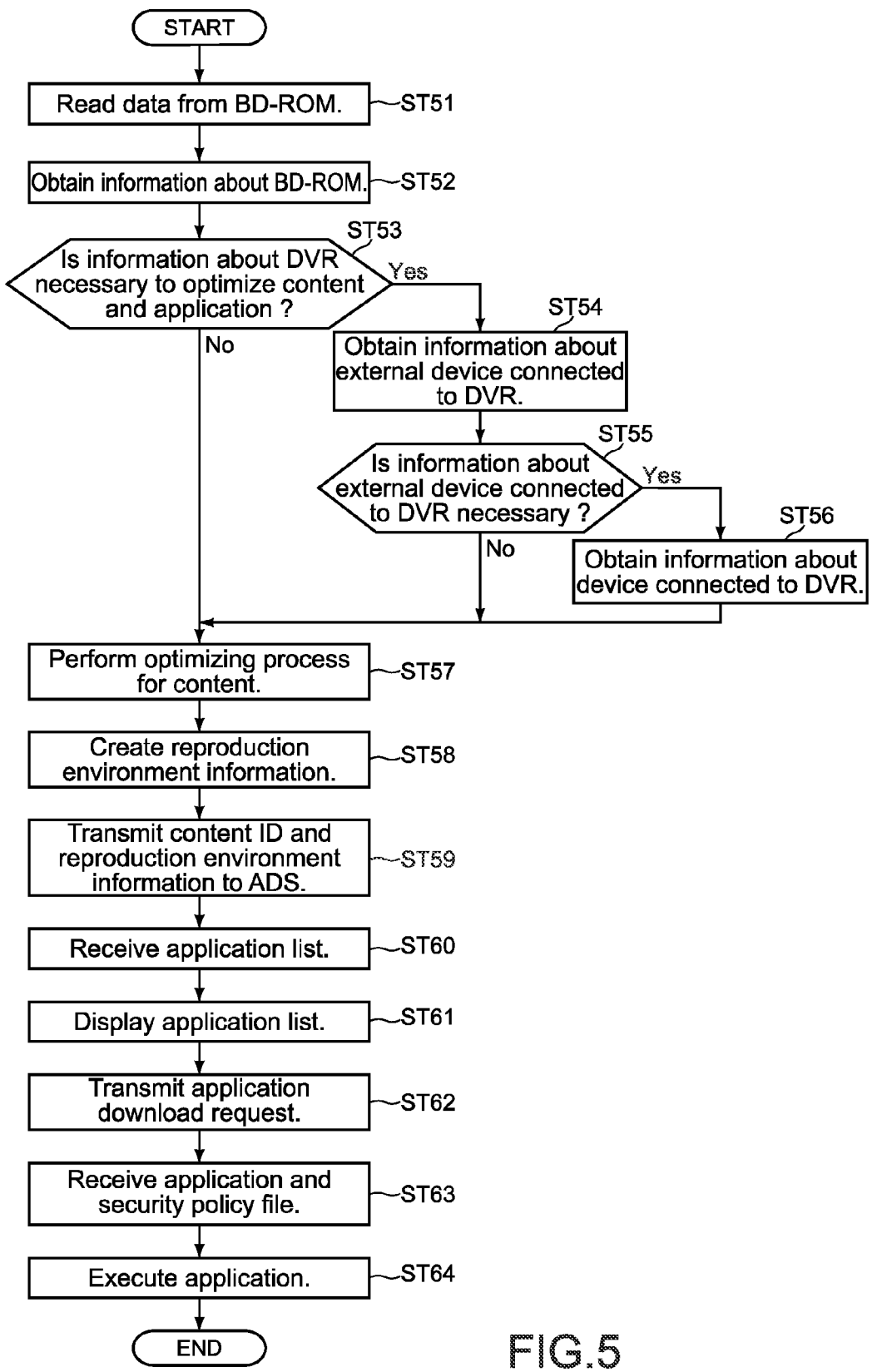
FIG. 5 is a flow chart showing a flow of an optimizing process for video content and an application by the DVR according to an embodiment of the present invention.

FIG. 5 is a flow chart showing an optimizing process of video content and an application 40. In this embodiment, in the state that a BD-ROM 10 has been inserted into the DVR 100, when the CPU 12 executes a BD-J recorded on the BD-ROM 10, the BD-J performs the optimizing process. In the following description, the process performed mainly by a BD-J is the same as the operation of the CPU 12 of the DVR 100.

As shown in FIG. 5, after the BD-ROM 10 is inserted into the insertion section of the DVR 100, the CPU 12 causes the optical disc drive 9 to read video content and a BD-J from the BD-ROM 10 and develops them in the RAM 14 (at step 51). Thereafter, the BD-J developed in the RAM 14 obtains information about the BD-ROM 10 such as a content ID and audience age restriction information (a so-called parental lock or rating system) for the video content (at step 52). Thereafter, the BD-J determines whether or not to obtain information about the DVR 100 to optimize video content and the application 40 associated therewith (at step 53). Unless the BD-ROM 10 is reproduction-only for a particular DVR, the BD-ROM 10 does not contain information about the DVR 100. Thus, at step 52, the determined result denotes that it is necessary to obtain information about the DVR 100.

When the determined result denotes that it is necessary to obtain information about the DVR 100, the BD-J obtains necessary information from the DVR 100 (at step 54). Examples of the necessary information include information about the DVR 100, namely information about specifications of the DVR 100 (information about hardware specifications and information about software specifications). Examples of the information of hardware specifications include the capacity of the RAM 14 of the DVR 100, the clock frequency of the CPU 12, and the network connection speed of the communication section 11. Examples of the information about software specifications include the applicable fonts, applicable character codes, permission/prohibition of calculations of floating decimal point, and information of applicable API. In addition, the necessary information includes information about the state of the DVR 100 that occurs when it reproduces video content from the BD-ROM 10. Examples of the information about the state of the DVR 100 include information that represents that a broadcast wave is being recorded in background. In addition, examples of the necessary information include past reproduction history information of video content.

Thereafter, the BD-J determines whether or not it is necessary to obtain information about an external device connected to the DVR 100 (hereinafter referred to as connected device information) to perform the foregoing optimizing process (at step 55). Examples of the external device include the TV 200, the microphone 21, and the camera 22. When an external device has been connected to the DVR 100, the BD-J determines that it be necessary to obtain the connected device information (Yes) and obtains the connected device information (at step 56). When no external device has been connected, the BD-J determines that it be not necessary to obtain the connected device information (No). Examples of the connected device information include the type of input/output device connected to the DVR 100 and the connection method thereof, information about display performance such as display size, number of effective colors, and luminance of the display device (TV 200). Examples of the connected device information also include information about the state of the external device that occurs when video data are reproduced from the BD-ROM 10. Examples of the information about the state of the external device include information that denotes that two TVs 200 are displaying data in a multi-display mode and information that denotes that the TV 200 is displaying data in a PinP mode.

Thereafter, the BD-J optimizes video content of the BD-ROM 10 based on the obtained information about specifications and connected device information of the DVR 100 (at step 57). This optimizing process may be contemplated to be various types of processes.

For example, when the BD-J has determined that the TV 200 have a large and high bright display based on connected device information, since character information of video content is legible, the BD-J controls the TV 200 to use highly ornamental and dirk color fonts of those of the DVR 100. In contrast, when the BD-J has determined that the TV 200 use a small and low bright display, since character information of the video content is illegible, the BD-J controls the TV 200 to use highly visible, bright color fonts of the DVR 100.

In addition, the BD-J can change a reproduction method of a so-called series of video content based on the reproduction history information. Next, this process will be described.

Figure 6:
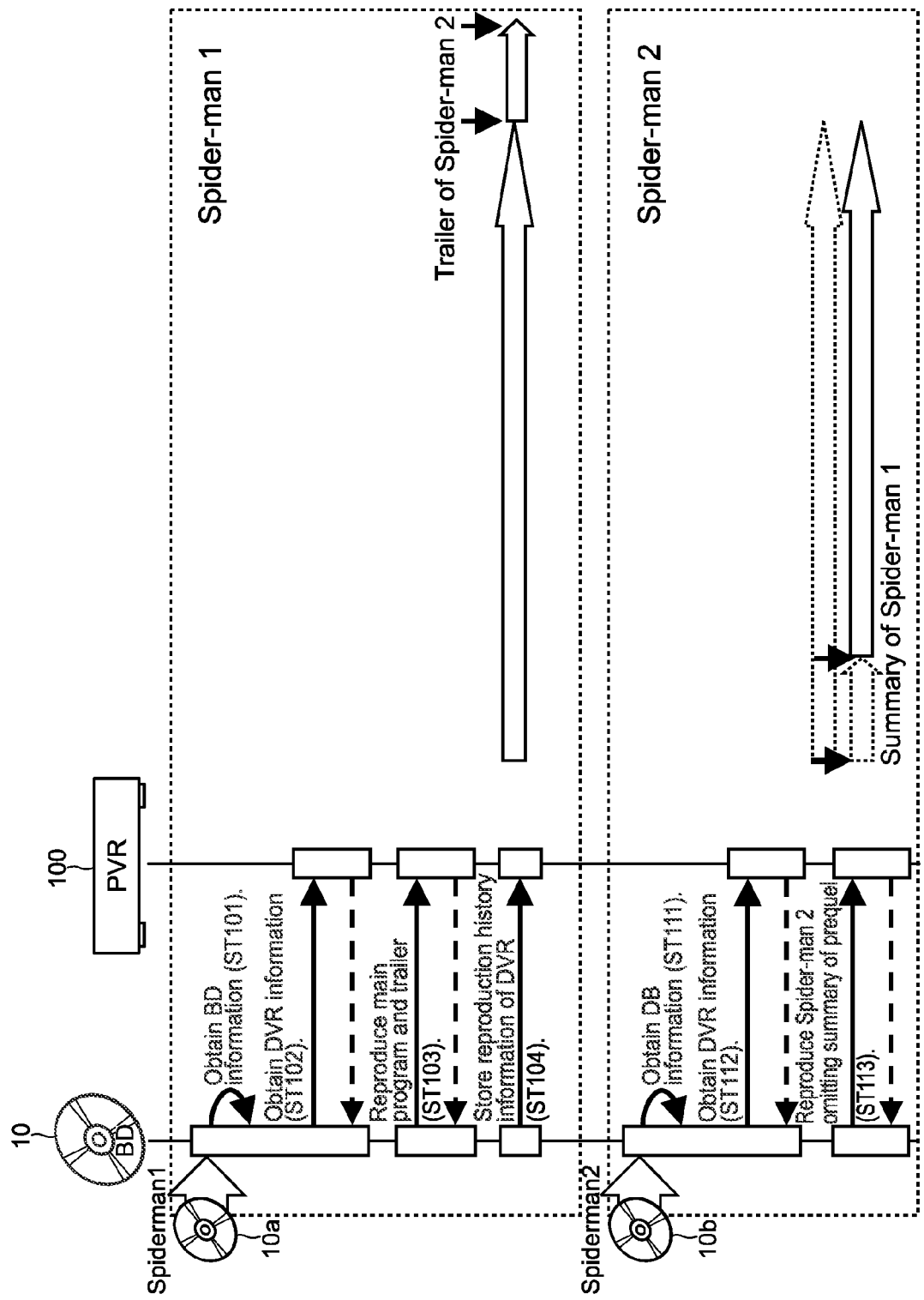
FIG. 6 is a sequence chart showing a flow of a process of changing a reproduction method for a series of video content based on reproduction history information by the DVR according to an embodiment of the present invention.

FIG. 6 is a sequence chart showing a flow of a process of changing a method of reproducing a series of video content based on the reproduction history information.

In FIG. 6, the case that video content "Spider-man 1" is reproduced from a BD-ROM 10a and video content "Spider-man 2" that is a sequel of video content "Spider-man 1" is reproduced from a BD-ROM 10b will be described.

In FIG. 6, the BD-ROM 10a on which video content "Spider-man 1" has been recorded contains a trailer as preview information of video content "Spider-man 2". In contrast, the BD-ROM 10b on which video content "Spider-man 2" has been recorded contains summary information of video content "Spider-man 1".

In FIG. 6, the BD-ROM 10a and BD-ROM 10b themselves or BD-Js recorded on the BD-ROM 10a and BD-ROM 10b each contain a content ID that identifies own video content. Each of the BD-ROMs 10a and 10b or each of these BD-Js may contain information that uniquely identifies the own BD-ROM 10 other than a content ID. As long as a content ID can identify a particular BD-ROM 10 (video content), the content ID does not depend on an ID system and uniqueness of all BD-ROMs 10. In this embodiment, for convenience, an ID that identifies video content "Spider-man 1" is designated by "S001" and an ID that identifies video content "Spider-man 2" is designated by "S002". In addition, it is assumed that the BD-J of the BD-ROM 10a has recognized the relationship between own content ID "S001" and content ID "002" of video content "Spider-man 2". Likewise, it is assumed that the BD-J of the BD-ROM 10b has recognized the relationship between own content ID "S002" and content ID "S001" of video content "Spider-man 1".

First, the operation of the BD-J of the BD-ROM 10a will be described. When the BD-ROM 10a is inserted into the DVR 100, the BD-J of the BD-ROM 10a checks for information necessary to reproduce video content "Spider-man 1" (at step 101). It is assumed that the BD-J of the BD-ROM 10a contains a program that causes the DVR 100 to reproduce the trailer of video content "Spider-man 2" when the DVR 100 has not reproduced video content "Spider-man 2", which is a sequel of video content "Spider-man 1", after the DVR 100 has reproduced the main program of video content "Spider-man 1". The BD-J of the BD-ROM 10a checks for this program and the own content ID.

Thereafter, the BD-J of the BD-ROM 10a obtains reproduction history information as necessary information for the DVR 100 (at step 102). The BD-J checks whether or not the DVR 100 has reproduced video content "Spider-man 2", which is the sequel of video content "Spider-man 1" based on a content ID contained in the reproduction history information and the own content ID.

When the determined result denotes that the DVR 100 has not reproduced video content "Spider-man 2", the BD-J of the BD-ROM 10a causes the DVR 100 to automatically reproduce the trailer of video content "Spider-man 2" after reproducing the main program of video content "Spider-man 1" (at step 103). Even if the determined result of the BD-J of the BD-ROM 10a denotes that the DVR 100 has reproduced video content "Spider-man 2", if a predetermined time has elapsed after the DVR 100 has reproduced video content "Spider-man 2", the BD-J of the BD-ROM 10a causes the DVR 100 to reproduce the trailer of video content "Spider-man 2". Examples of the predetermined period includes one week, two weeks, and one month, but not limited thereto. In addition, the user may be able to customize this predetermined period.

After the DVR 100 reproduces video content "Spider-man 1", the BD-J of the BD-ROM 10a stores information, for example, of "YYYY:MM:DD:HH:MM:SS:S001" (denoting that content S001 has been reproduced at HH:MM:SS on MM DD, YYYY) as reproduction history information to the HDD 8 or the like of the DVR 100 (at step 104).

Next, the operation of the BD-J of the BD-ROM 10b will be described.

When the BD-ROM 10b is inserted into the DVR 100, the BD-J of the BD-ROM 10b checks for information necessary to reproduce video content "Spider-man 2" (at step 111). It is assumed that the BD-J of the BD-ROM 10b contains a program that causes the DVR 100 to omit reproduction of the summary information of video content "Spider-man 1" when starting reproducing the main program of video content "Spider-man 2", if the DVR 100 has reproduced video content "Spider-man 1", which is a prequel of video content "Spider-man 2". The BD-J of the BD-ROM 10b checks for this program and the own content ID.

Thereafter, the BD-J of the BD-ROM 10b obtains reproduction history information as necessary information for the DVR 100 (at step 112). The BD-J checks whether or not the DVR 100 has reproduced video content "Spider-man 1", which is the prequel of video content "Spider-man 2", based on a content ID contained in the reproduction history information and the own content ID.

When the determined result denotes that the DVR 100 has reproduced video content "Spider-man 1", the BD-J of the BD-ROM 10b causes the DVR 100 to omit reproduction of summary information of video content "Spider-man 1" when starting reproducing the main program of video content "Spider-man 2" (at step 113).

Returning to FIG. 5, the BD-J combines the obtained information about the BD-ROM, information about specifications, and connected device information and generates reproduction environment information (at step 58). Thereafter, the BD-J transmits the generated reproduction environment information and the own content ID to the ADS 300 (at step 59).

Figure 7:
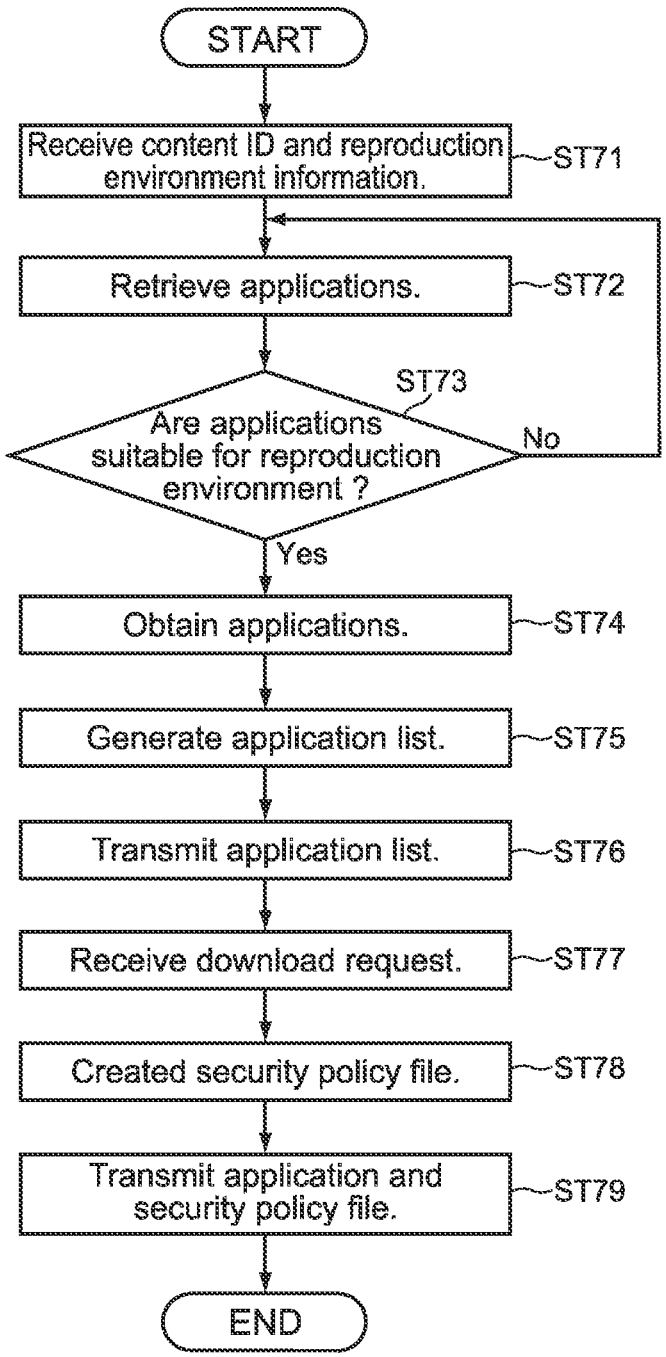
FIG. 7 is a flow chart showing an application retrieval process and a transmission process by the ADS according to an embodiment of the present invention.

The ADS 300 retrieve an application associated with video content of the BD-ROM 10 based on the reproduction environment information and the content ID and causes the DVR 100 to download the application according to a request from the BD-J of the DVR 100. FIG. 7 is a flow chart showing a download process of the ADS 300. Next, with reference to FIG. 5 and FIG. 7, the download process for applications by the DVR 100 will be described.

As shown in FIG. 7, the CPU 31 of the ADS 300 receives the content ID and the reproduction environment information from the DVR 100 (at step 71). Thereafter, the CPU 31 retrieves applications that match the content ID from the application server 400 (at step 72).

Thereafter, the CPU 31 determines whether or not the retrieved applications are suitable for the reproduction environment information (at step 73). For example, when the reproduction environment information contains audience age restriction information, the CPU 31 excludes applications that do not match the audience age restriction information. When the reproduction environment information contains connected device information, the CPU 31 retrieves applications that can be executed by an external device connected to the DVR 100 or the TV 200 from the application server 400.

Thereafter, the CPU 31 obtains applications that it has determined that they are suitable for the reproduction environment from the application server 400 (at step 74), creates a list of the applications (at step 75), and transmits the list to the DVR 100 (at step 76).

As shown in FIG. 5, the BD-J of the DVR 100 receives the application list from the ADS 300 (at step 60). The BD-J causes the video control section 16 to create an appropriate graphical user interface (GUI) that represents the application list and outputs the application list to the TV 200 to display it through the created GUI (at step 61).

Thereafter, when the BD-J receives a user's operation input that selects at least one of the applications on the application list from the operation input section 15, the BD-J transmits a download request for the selected application(s) to the ADS 300 (at step 62).

As shown in FIG. 7, the CPU 31 of the ADS 300 receives a download request for the application from the DVR 100 (at step 77). Thereafter, the CPU 31 creates a security policy file that restricts the application(s) that has been requested to be downloaded from accessing video content of the BD-ROM 10 (at step 78). When there are a plurality of applications requested to be downloaded, the security policy file is created by combining access controls for the plurality of applications as one file. The CPU 31 transmits the application(s) requested to be downloaded to the DVR 100 along with the security policy file (at step 79).

As shown in FIG. 5, the BD-J of the DVR 100 receives the application(s) and the security policy file from the ADS 300 (at step 63). Thereafter, the BD-J executes the application(s) based on the security policy file while reproducing video content of the BD-ROM 10 (at step 64). Since access control for the application(s) is executed based on the security policy file, the application(s) is prevented from controlling and modifying video content in a manner not intended by the content provider.

A variety of applications may be downloaded from the ADS 300 can be contemplated depending on the application servers 400. The substance of access control based on the security policy file depends on applications.

For example, a BD-J can permit a downloaded application to open an access to only necessary information based on the security policy file. For example, when a tour company uses the application server 400, it may provide an application that allows the user to apply for a tour that visits a place promoted by video content. This application correlates information about settings of scenes of video content with time line information. In other words, this application can function when it can access only time line information in various types of data of video content. Thus, when the BD-J executes this application, for example, the security policy file permits the BD-J to access time line information in various types of data of video content and restricts it to access video and audio data based on the security policy file.

When a game creation company uses the application server 400, it may provide a game application that performs an instrument to the rhythm of music data of video content. This application can function by only accessing particular music data. Thus, when the BD-J executes this application, it may be permitted to access only music data in various types of data of video content based on the security policy file. When the BD-ROM 10 contains musical score information, the BD-J may cause the application to access only musical score information and create a musical score for a game. When the BD-ROM 10 does not contain musical score information, the BD-J may download musical score information from the application server 400 or the ADS 300. In addition, the BD-J may permit the game application to access music data, but not permit it to change reproduction speeds (trick play such as fast-forward) and reproduction scales.

When audience age restrictions have been applied to video content based on the security policy file, the BD-J may apply the audience age restrictions to an application. For example, when a video/music/book sales company uses the application server 400, it may provide an application that allows the user to buy videos, sound tracks, and books associated with video content on line. In this case, when video content has been rated as R18 (restricted under age 18), the BD-J may cause the application to exclude adult content from a sales list of videos/books.

In addition, the BD-J may prohibit main video data of video content and an application from coexisting based on the security policy file to prevent the main video data from being secondary modified. For example, when an apparel sales company uses the application server 400, it may provide an application that allows the user to buy cloths that a person in video content wears. In this case, the BD-J may cause the application not to overlay a cloth order screen with main video data. Instead, although the BD-J causes the application to overlay the order screen with the main video data, the BD-J may cause the main video data to be paused. Instead, the BD-J may designate a position or a time where or when the BD-J causes the application to overlay the order screen with the main video data based on the security policy file. For example, the BD-J may cause the application not to overlay images of persons and characters that do not relate to those of main video data in an area for a face of a particular person of the main video data based on the security policy file.

In addition, the BD-J may cause the application to assign an access period for various types of data of video content based on the security policy file. For example, the BD-J may prohibit the application from accessing various types of data of video content within a predetermined period after release of the BD-ROM 10.

In addition, the BD-J may restrict regions and domains (URLs) where the application can be executed based on the security policy file. For example, the application server 400 may provide an application that allows the user to buy a song associated with video content through a music delivery service. When this service is provided worldwide, the BD-J can restrict application server 400 disposed outside Japan to provide this application. Thus, even if copyright coverage differs in each country's legal system, the application can be adequately controlled.

Figure 8:
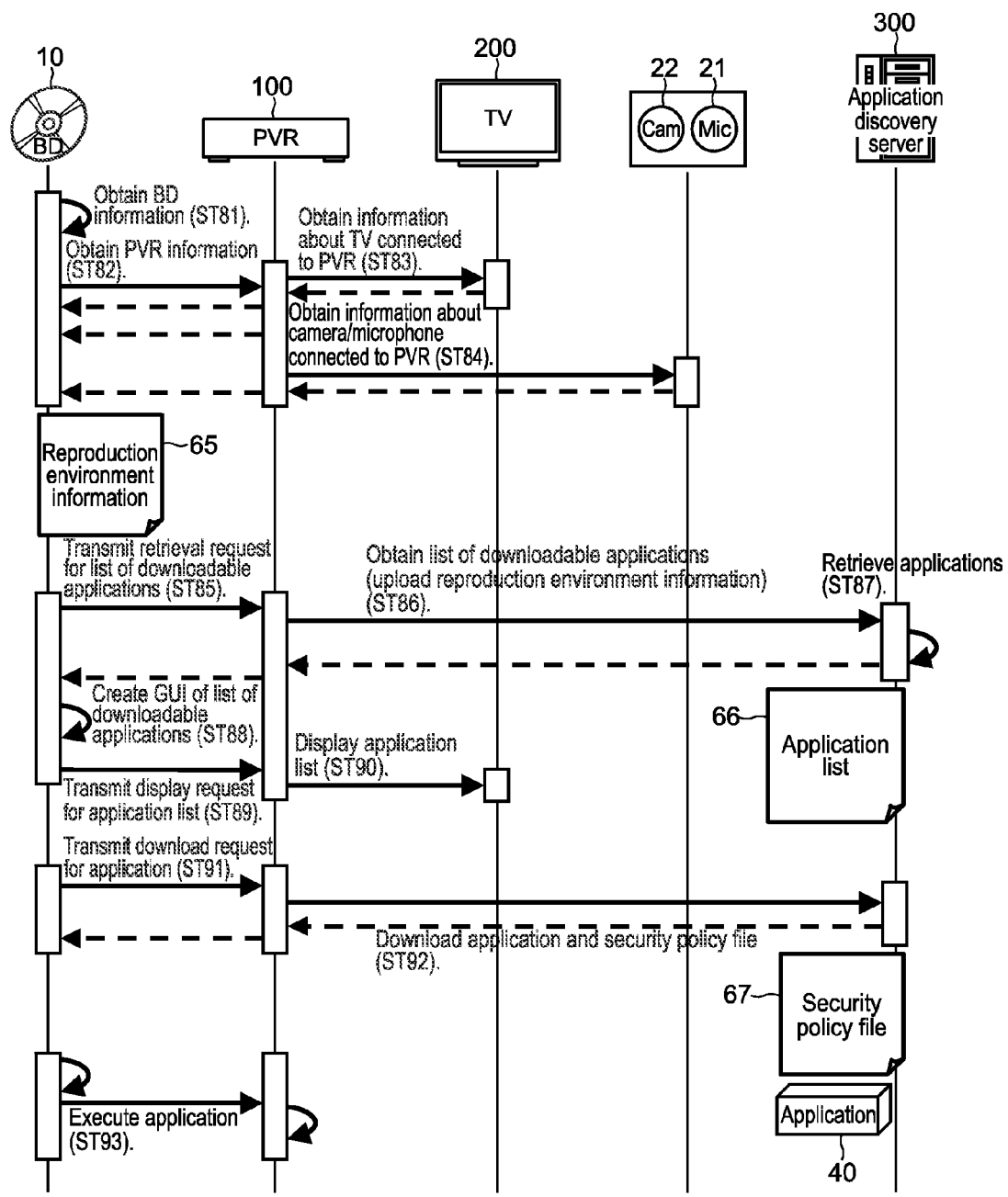
FIG. 8 is a sequence chart showing a flow of an application execution process by the DVR and the ADS according to an embodiment of the present invention.

In addition, the application server 400 may provide an English learning application according to the substance of video content. The English learning application executes remote language learning using AV chatting. This application becomes executable when the DVR 100 is provided with the microphone 21 and the camera 22. Next, with an example in which the DVR 100 downloads this application and executes it, processes of the DVR 100 and the ADS 300 will be described in detail. FIG. 8 is a sequence chart showing these processes.

In FIG. 8, it is assumed that video content "Spider-man 2" having the foregoing ID [S002] has been recorded on the BD-ROM 10. In addition, the ADS 300 has recognized the ID [S002]. Moreover, the microphone 21 and the camera 22 have been connected as external devices to the DVR 100.

As shown in FIG. 8, when the BD-ROM 10 is inserted into the DVR 100, the BD-J checks for necessary information to reproduce video content "Spider-man 2" (at step 81). In this embodiment, it is assumed that the BD-J has a program that can obtain information about external devices connected to the DVR 100 to reproduce the video content. Thus, the BD-J obtains the program and the own content ID.

Thereafter, the BD-J obtains information about specifications, reproduction history information, and so forth from the DVR 100 (at step 82). In addition, the BD-J obtains the connected device information from the external devices such as the TV 200, the microphone 21, and the camera 22 connected to the DVR 100 (at steps 83 and 84). Thus, the BD-J recognizes that the microphone 21 and the camera 22 have been connected as external devices.

Thereafter, the BD-J combines information about the BD-ROM, information about specifications of the DVR 100, and connected device information and generates reproduction environment information 65. Thereafter, the BD-J causes the DVR 100 to transmit a request for a list of downloadable applications to the ADS 300 along with the reproduction environment information 65 and content ID [S002] (at steps 85 and 86).

FIG. 9A is a schematic diagram showing an example of the reproduction environment information 65. As shown in FIG. 9A, the reproduction environment information 65 is described, for example, in XML and contains information about the BD-ROM 10 (<media>) and information about the DVR 100 and a connected device (<player>).

Thereafter, the ADS 300 that has received the reproduction environment information and the content ID retrieves applications that satisfy necessary environment for video content "Spider-man 2" based on these kinds of information (at step 87). Thereafter, the ADS 300 generates an application list 66 based on the retrieved result and transmits the application list 66 to the DVR 100. In this case, the application list 66 contains one application, "Spider-man 2 English conversation learning application"

FIG. 9B is a schematic diagram showing an example of the application list 66. As shown in FIG. 9B, the application list 66 is described, for example, in XML. The application list 66 contains information about various types of applications including the foregoing "Spider-man 2 English conversation learning application" as <item> besides applications for online shopping, trailer, and so forth.

Thereafter, when the BD-J receives the application list, the BD-J creates an appropriate GUI that represents the application list (at step 88) and transmits a display request for the application list on the TV 200 to the DVR 100 (at step 89). The CPU 12 of the DVR 100 causes the TV 200 to display the application list on the TV 200 according to the display request (at step 90).

Thereafter, when "Spider-man 2 English conversation learning application" is selected on the operation input section 15, the BD-J transmits a download request for the application to the ADS 300 through the DVR 100 (at step 91). The ADS 300 creates a security policy file 67 corresponding to "Spider-man 2 English conversation learning application" and transmits it to the ADS 300 along with the application (at step 92).

FIG. 9C is a schematic diagram showing an example of the security policy file 67. The security policy file 67 is also described, for example, in XML. In this example, the security policy file permits an application to access time line data and subtitle data and also a part of data corresponding to a predetermined time line of video data. In addition, the security policy file prohibits the application from accessing metadata containing predetermined words.

When the BD-J downloads "Spider-man 2 English conversation learning application" and the security policy file from the ADS 300, the BD-J binds them with data of video content "Spider-man 2" of the BD-ROM 10. The "Spider-man 2 English conversation learning application" that is bound to the data of video content "Spider-man 2" creates a language learning material from video content "Spider-man 2", and allows the user to remotely learn language using AV chatting through the microphone 21 and the camera 22 connected.

Figure 10:
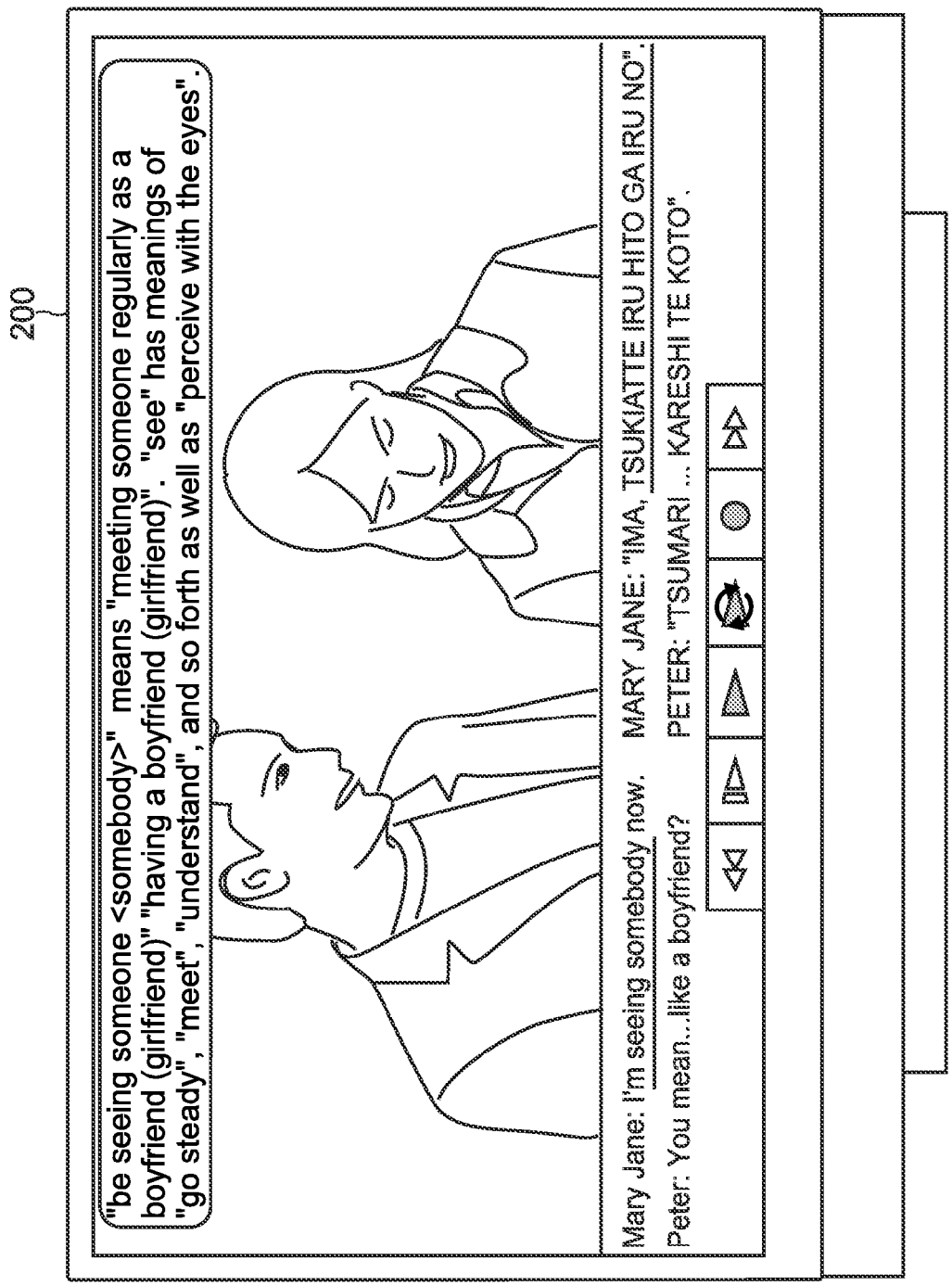
FIG. 10 is a schematic diagram showing an example of an execution screen on which an English conversation learning application is executed in an embodiment of the present invention.

FIG. 10 is a schematic diagram showing an example of a screen displayed on the TV 200 while the "Spider-man 2 English conversation learning application" is being executed. As shown in FIG. 10, this application explains conversation phrases that persons in a particular scene of video content "Spider-man 2" talk to each other from a view point from English conversation learning. In addition, the security policy file prohibits the application from accessing video data of scenes not used for English conversation learning and metadata containing words not suitable for English conversation learning.

Figure 11:
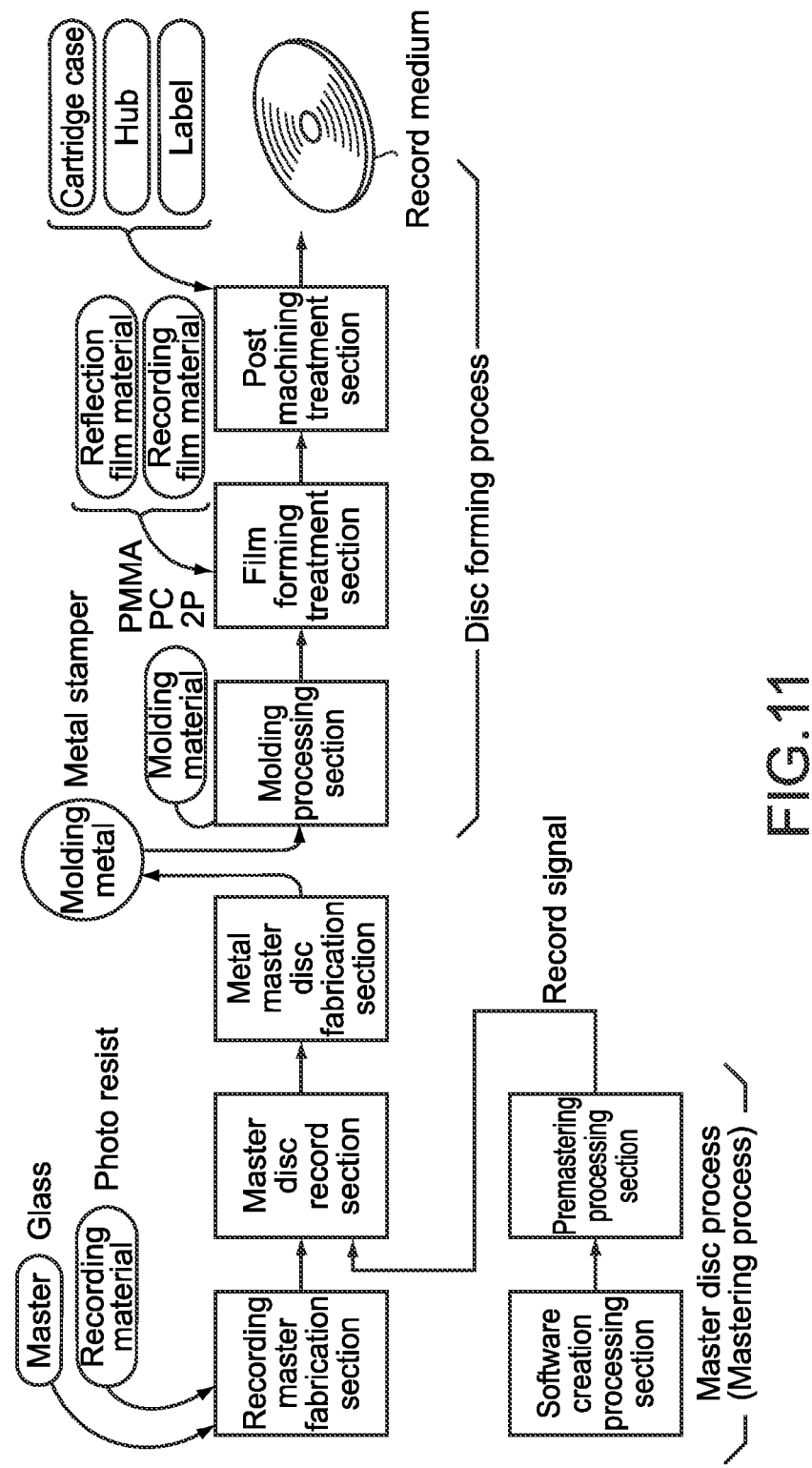
FIG. 11 is a schematic diagram describing a manufacturing method of an optical disc on which data reproducible by the DVR have been recorded according to an embodiment of the present invention.
Figure 12:
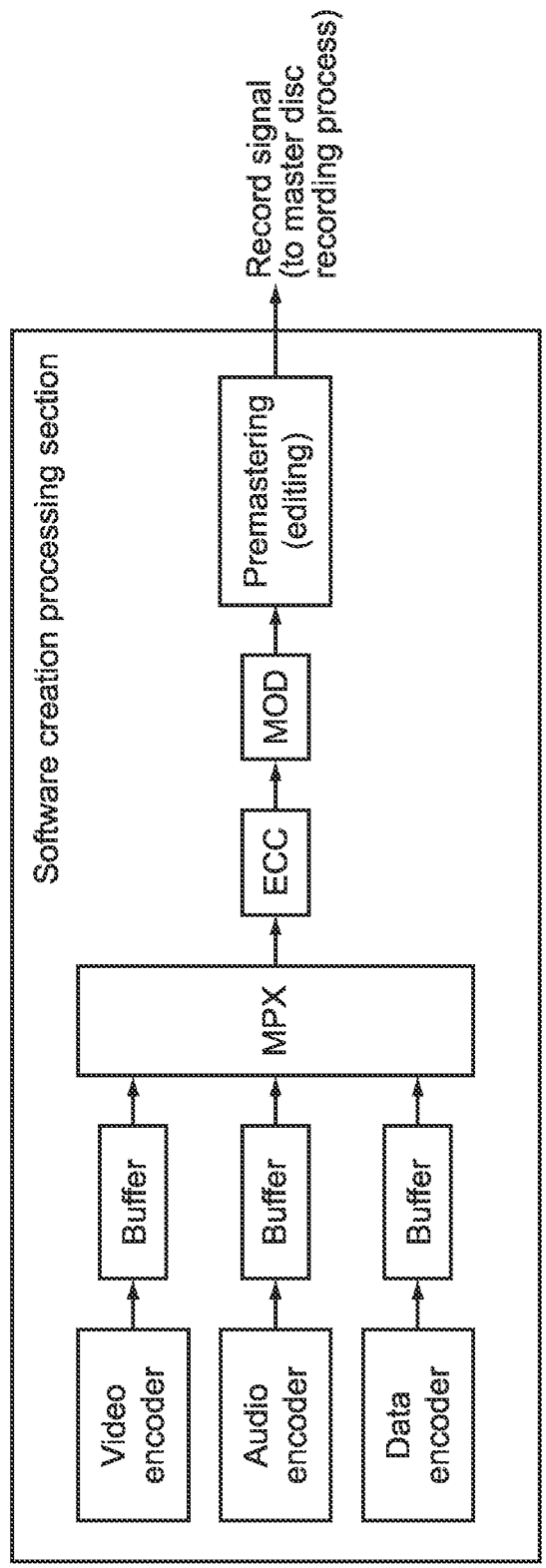
FIG. 12 is a schematic diagram describing a manufacturing method of an optical disc on which data reproducible by the DVR have been recorded according to an embodiment of the present invention.

Next, a method of fabricating an optical disc such as the forgoing BD-ROM 10 as a record medium on which data that can be reproduced by the DVR 100 have been recorded will be described. FIG. 11 and FIG. 12 are schematic diagrams explaining the method of fabricating such an optical disc.

As shown in FIG. 11, a master disc made, for example, of glass is prepared. A record material made, for example, of photo resist is coated on the master disc. As a result, a recording master disc is obtained.

Thereafter, as shown in FIG. 12, in a software creation processing section, video data that have been encoded by an encoding device (video encoder) and that can be reproduced by the DVR 100 are temporarily stored in a buffer. In addition, audio data that have been encoded by an audio encoder are temporarily stored in a buffer. Moreover, non-stream data (for example, indexes, playlists, playitems, and so forth) that have been encoded by a data encoder are temporarily stored in a buffer. The video data, audio data, and non-stream data stored in respective buffers are multiplexed along with a synchronous signal by a multiplexing device (MPX) and then error correction codes are added to the multiplexed data by an error correction code encoding circuit (ECC). The resultant data are modulated according to a predetermined modulation system by a modulation circuit (MOD) and temporarily recorded, for example, on a magnetic tape, according to a predetermined format. Thereafter, software such as the foregoing BD-J is recorded on an optical disc such as the BD-ROM 10 whose data can be reproduced by the DVR 100.

When necessary, the software is edited (pre-mastered) and signals are generated in a recording format for the optical disc. As shown in FIG. 11, a laser beam is modulated corresponding to the record signals and the laser beam is irradiated onto the photo resist on the master disc. As a result, the photo resist on the master disc is exposed corresponding to the record signals.

Thereafter, the master disc is developed and pits are formed on the master disc. The resultant master disc is electrically cast and the pits on the glass master disc are transferred to a metal master disc. With the metal master disc, a metal stamper is fabricated as a molding die.

A material such as polymethylmethacrylate (PMMA) or polycarbonate (PC) is injected into the molding die and solidified. Instead, after ultraviolet-curing resin (photopolymer) or the like is coated on the metal stamper, the resin may be cured by irradiating ultraviolet rays thereon. Thus, the pits on the metal stamper are transferred to a replica made of a resin.

A reflection film is formed on the replica by evaporation, spattering, or the like. Instead, a reflection film is formed on the replica by spin-coating.

Thereafter, necessary treatments such as machining of the inner and outer diameters of the disc and adhering of two discs are performed. Thereafter, a label is adhered on the front surface of the disc and a hub is mounted on the disc. Thereafter, the disc is inserted into a cartridge. In such a manner, an optical disc on which data that can be reproduced by the DVR 100 have been recorded is obtained. Of course, a hub may not be mounted on the optical disc. In addition, the optical disc may be a bare disc that is not housed in a cartridge.

As described above, according to this embodiment, the BD-J obtains information about the DVR 100 and external devices to optimize video content recorded on a BD-ROM according to reproduction environment. In addition, a BD-J downloads an application and a security policy file from the ADS 300 to execute the application associated with video content in the optimum state for the content.

In the foregoing embodiment, after the BD-J of the DVR 100 downloads a security policy file and an application from the ADS 300, the BD-J may download the security policy file when executing the application. In this case, even if the security policy file has been rewritten by the ADS 300 after the application has been received until it is executed, the BD-J can appropriately execute the application. In other words, the BD-J can adequately execute access control for an application to video content based on the latest security policy file. In addition, if the substance of the security policy file that has been originally downloaded is different from the substance of the file that is downloaded again, the BD-J may inform the user about that through an appropriate GUI to gain permission of execution of the latest security policy file from him or her.

In the foregoing embodiment, as an example, the TV 200, the microphone 21, and the camera 22 are connected as external devices to the DVR 100. It should be noted that the external devices are not limited to them. For example, an BD-J can optimize video content and execute an optimum application based on the type of a remote controller connected to the DVR 100. When the BD-J recognizes that a gun type or a foot-pedal type remote controller has been connected, the BD-J transmits information about this as connected device information to the ADS 300. The ADS 300 retrieves applications such as games that the remote controller can operate and transmits an application list 66 including such applications to the ADS 300.

In the foregoing embodiment, as an example, the BD-ROM 10b for video content "Spider-man 2" contains summary information of video content "Spider-man 1" and the BD-ROM 10a for video content "Spider-man 1" contains the trailer of video content "Spider-man 2". However, if both the BD-ROMs 10a and 10b do not contain summary information and trailer, each of the BD-Js may download summary information and trailer retrieved as applications from the ADS 300.

In this case, the ADS 300 determines whether or not to contain summary information and trailer (or an application that allows the user to buy them) in the application list based on the content ID and reproduction history information. In other words, when the ADS 300 has determined that the DVR 100 has not reproduced video content "Spider-man 2" based on the reproduction history information received from the BD-J of the BD-ROM 10a, the ADS 300 causes the trailer to be contained in the application list. In contrast, when the ADS 300 has determined that the DVR 100 has not reproduced video content "Spider-man 1" or it has taken a long time after the reproduction based on the reproduction history information received from the BD-J of the BD-ROM 10b, the ADS 300 causes the summary information to be contained in the application list. In this case, the DVR 100 downloads the summary information and trailer as applications along with the security policy file and executes the applications automatically or according to a user's operation.

In the foregoing embodiment, as an example, a downloadable application allows the user to buy goods associated with visual content on line. When executing this application, the BD-J may check whether or not the DVD 100 has an online member ID and a password as information about the DVR 100. In this case, when the determined result denotes that the DVR 100 has the ID and password, the BD-J is controlled to execute applications that use the ID and password with priority. In addition, the BD-J may transmit the ID and password as reproduction environment information to the ADS 300 and authenticates the DVR 100 through the ADS 300 and downloads the applications in an executable form.

In the foregoing embodiment, the BD-J may change the types of applications that can be downloaded from the ADS 300 corresponding to information about the state of the DVR 100. For example, when the BD-J transmits information that denotes that the DVR 100 is recording a broadcast wave in background to the ADS 300, it may cause only applications that do not exceed a predetermined capacity to be contained in an application list. Thus, the download burden against the DVR 100 can be reduced. In addition, the BD-J may change the types of applications that can be downloaded from the ADS 300 based on information about the state of the display device (TV 200). For example, when the BD-J transmits information that denotes that the TV 200 is displaying data with a multi-display mode or a PinP mode to the ADS 300, it retrieves applications suitable for the display mode of the TV 200. Namely, the BD-J can download and execute applications that use the multi-display mode or PinP mode.

In the foregoing embodiment, a BD-J may transmit model information of the DVR 100 as reproduction environment information to the ADS 300 and download and execute applications that can be executed by models of particular manufacturers.

In the foregoing embodiment, a BD-J may transmit information that denotes that a child watches video content with his or her parent(s) as reproduction environment information to the ADS 300 and download and execute an application that causes the TV 200 to automatically obscure violence scenes.

In the foregoing embodiment, an ADS 300 is separated from an application servers 400. Instead, the ADS 300 may be included as a function of the application server 400. In other words, the ADS 300 may store various types of applications in the own HDD or the like. When the ADS 300 is requested for an application from the DVR 100, the ADS 300 may retrieve applications associated with video content of the BD-ROM 10 reproduced by the DVR 100 from the HDD and provide the retrieved applications to the DVR 100.

The foregoing embodiment was applied to a DVR as an example of the electronic apparatus that can reproduce video content. However, examples of the electronic apparatus may include a PC, a game machine, a mobile phone, a portable audio/visual reproduction device, a digital video camera, a PDA, a car navigation device, a robot device, and other electric appliances.

In the foregoing embodiment, video content that is reproduced has been recorded on the BD-ROM 10. Instead, video content may be downloaded over a network to the DVR 100 or broadcast content recorded on the HDD 36 or the like. In this case, when such video content is downloaded and recorded, necessary information such as a content ID is recorded on the DVR 100.

The present application contains subject matter related to that disclosed in Japanese Priority Patent Application JP 2008-127205 filed in the Japanese Patent Office on May 14, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
a reproduction means for allowing first video content containing a plurality of types of data and first identification information to be reproduced;
a transmission means for transmitting the first identification information to a server apparatus;
a reception means for receiving a first application and first access control information from the server apparatus, the first application being associated with but different from the first video content and being retrieved by the server apparatus based on the transmitted first identification information, the first access control information being generated by the server apparatus based on the first identification information and representing a condition in which the first application accesses the individual types of the data contained in the first video content; and
a control means for executing the received first application based on the received first access control information when the first video content is reproduced.

2. The electronic apparatus as set forth in claim 1,
wherein the reception means receives the first access control information again from the server apparatus when the received first application is executed, and
wherein the control means executes the received first application based on the first access control information which has been received again.

3. The electronic apparatus as set forth in claim 1,
wherein the first video content has been recorded on a first portable record medium along with a first program which causes the first video content to be reproduced and the first identification information to be transmitted, and
wherein the control means executes the first program which has been recorded.

4. The electronic apparatus as set forth in claim 3,
wherein the reception means receives a list of a plurality of different applications including the first application retrieved by the server apparatus therefrom and receives a plurality of applications selected from the list and one piece of the first access control information from the server apparatus, the first access control information being generated by the server apparatus and representing a condition in which the selected plurality of applications access the individual types of the data, wherein the transmission means transmits a transmission request signal which requests for transmission of the selected applications to the server apparatus, and wherein the control means receives a user's operation input which selects the plurality of applications and executes the received plurality of applications based on the received one piece of the first access control information.

5. The electronic apparatus as set forth in claim 3,
wherein the control means obtains information about specifications of at least either of hardware specifications and software specifications of the electronic apparatus by executing the first program, wherein the transmission means transmits the obtained information about specifications to the server apparatus along with the first identification information by executing the first program, and wherein the reception means receives, by executing the first program, the first application retrieved by the server apparatus based on the first identification information and the information about specifications that have been transmitted.

6. The electronic apparatus as set forth in claim 5, further comprising:

a connection means connectable to an external device,
wherein the control means obtains connected device information about the connected external device through the connection means by executing the first program, wherein the transmission means transmits the obtained connected device information to the server apparatus along with the first identification information and the specification information by executing the first program, and wherein the reception means receives, by executing the first program, the first application retrieved by the server apparatus based on the first identification information, the specification information, and the connected device information which have been transmitted.

7. The electronic apparatus as set forth in claim 3, further comprising:

a storage means for storing first reproduction history information that denotes whether or not the first video content has been reproduced by the reproduction means based on the first identification information, wherein the reproduction means is capable of reproducing second video content which has summary information of the first video content and which is a sequel of the first video content, and wherein the control means determines whether or not the first video content has been reproduced based on the first reproduction history information when the second video content is reproduced and controls the reproduction means not to reproduce the summary information if the control means has determined that the first video content has been reproduced.

8. The electronic apparatus as set forth in claim 7,
wherein the control means controls the reproduction means to reproduce the summary information if a predetermined period has elapsed after the first reproduction history information has been stored when the second video content is reproduced.

9. The electronic apparatus as set forth in claim 7,
wherein the second video content contains a plurality of types of data and second identification information and has been recorded on a second portable record medium along with a second program which causes the second video content to be reproduced and the second identification information to be transmitted, wherein the transmission means transmits the second identification information and the first reproduction history information to the server apparatus when the second video content is reproduced, wherein the reception means receives a second application and second access control information from the server apparatus, the second application being retrieved by the server apparatus when it has been determined, based on the second identification information and the first reproduction history information which have been transmitted, that the first content has not been reproduced and allowing the user to buy the first video content, the second access control information representing a condition in which the second application accesses the individual types of the data contained in the second video content, and wherein the control means executes the received second application based on the received second access control information when the second video content is reproduced.

10. The electronic apparatus as set forth in claim 7,
wherein the first video content contains preview information of the second video content, wherein the storage means stores second reproduction history information which denotes whether or not the second video content has been reproduced by the reproduction means based on the second identification information, and wherein the control means determines whether or not the second video content has been reproduced based on the second reproduction history information when the first video content is reproduced and controls the reproduction means not to reproduce the preview information if the control means has determined that the second video content has been reproduced.

11. The electronic apparatus as set forth in claim 3, further comprising:

a connection means connected to a display device,
wherein the control means obtains display performance information about a display performance of the display device through the connection means from the display device, changes a font and a luminance of character information contained in the first video content based on the display performance information which has been obtained, and outputs the resultant first video content to the display device by executing the first program.

12. The electronic apparatus as set forth in claim 3,
wherein the first video content contains audience age restriction information which restricts a user who is under a predetermined age from watching the first video content, wherein the transmission means transmits the audience age restriction information to the server apparatus along with the first identification information by executing the first program, and wherein the reception means receives, by executing the first program, the first application having the audience age restriction information and being retrieved by the server apparatus based on the first identification information and the audience age restriction information which have been transmitted.

13. The electronic apparatus as set forth in claim 3,
wherein the first access control information contains execution location information which restricts an execution location of the first application to a predetermined execution location over a network, and wherein the control means restricts the first application from being executed in other than the predetermined execution location based on the execution location information.

14. A content reproduction method, comprising:

transmitting identification information which identifies video content containing a plurality of types of data to a server apparatus;

receiving an application and an access control information from the server apparatus, the application being associated with but different from the video content and being retrieved by the server apparatus based on the transmitted identification information, the access control information being generated by the server apparatus based on the identification information and representing a condition in which the application accesses the individual types of the data contained in the video content, and executing the received application based on the received access control information when the video content is reproduced.

15. A record medium on which a program has been recorded, the program being executed by an electronic apparatus, the program comprising:

transmitting identification information which identifies video content containing a plurality of types of data to a server apparatus;

receiving an application and an access control information from the server apparatus, the application being associated with but different from the video content and being retrieved by the server apparatus based on the transmitted identification information, the access control information being generated by the server apparatus based on the identification information and representing a condition in which the application accesses the individual types of the data contained in the video content, and executing the received application based on the received access control information when the video content is reproduced.

16. A server apparatus comprising:

a reception means for receiving identification information from an electronic apparatus which is capable of reproducing video content containing a plurality of types of data and the identification information;

a retrieval means for retrieving an application associated with but different from the video content based on the received identification information;

a generation means for generating access control information which represents a condition in which the retrieved application accesses the individual types of the data contained in the video content; and a transmission means for transmitting the retrieved application and the generated access control information to an electronic apparatus.

17. The server apparatus as set forth in claim 16, wherein the reception means receives from the electronic apparatus information about specifications of at least either of hardware specifications and software specifications of the electronic apparatus, and wherein the retrieval means retrieves the application based on the identification information and the information about specifications which have been received.

18. The server apparatus as set forth in claim 16, wherein the reception means receives connected device information about an external device connected to the electronic apparatus from the electronic apparatus, and wherein the retrieval means retrieves the application based on the identification information and the connected device information which have been received.

19. The server apparatus as set forth in claim 16, wherein the reception means receives reproduction history information that denotes whether or not the video content has been reproduced by the electronic apparatus from the electronic apparatus, and wherein the retrieval means retrieves the application based on the identification information and the reproduction history information which have been received.

20. An electronic apparatus, comprising:

a reproduction section to allow first video content containing a plurality of types of data and first identification information to be reproduced;

a transmission section to transmit the first identification information to a server apparatus;

a reception section to receive a first application and first access control information from the server apparatus, the first application being associated with but different from the first video content and being retrieved by the server apparatus based on the transmitted first identification information, the first access control information being generated by the server apparatus based on the first identification information and representing a condition in which the first application accesses the individual types of the data contained in the first video content; and a control section to execute the received first application based on the received first access control information when the first video content is reproduced.

21. A server apparatus comprising:

a reception section to receive identification information from an electronic apparatus which is capable of reproducing video content containing a plurality of types of data and the identification information;

a retrieval section to retrieve an application associated with but different from the video content based on the received identification information;

a generation section to generate access control information which represents a condition in which the retrieved application accesses the individual types of the data contained in the video content; and a transmission section to transmit the retrieved application and the generated access control information to an electronic apparatus.

* * * * *